UNITED STATES PATENT OFFICE.

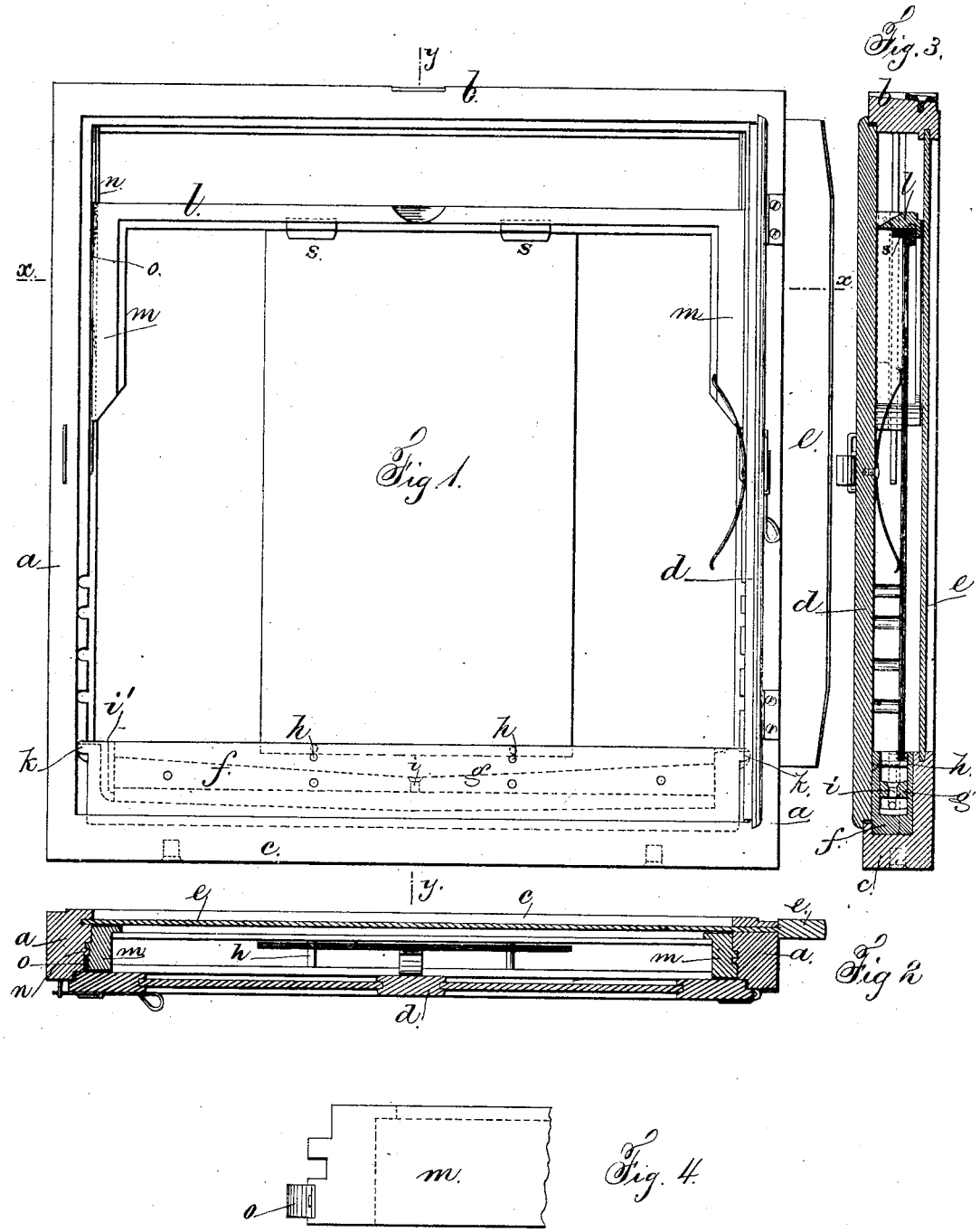

MATHIAS FLAMMANG, OF NEWARK, NEW JERSEY, ASSIGNOR TO SCOVILL MANUFACTURING COMPANY, OF WATERBURY, CONNECTICUT.

PLATE-HOLDER FOR CAMERAS.

SPECIFICATION forming part of Letters Patent No. 240,016, dated April 12, 1881.

Application filed March 7, 1881. (No model.)

*To all whom it may concern:*

Be it known that I, MATHIAS FLAMMANG, of Newark, in the county of Essex and State of New Jersey, have invented an Improvement in Plate-Holders for Cameras, of which the following is a specification.

Plate-holders have been made with a tray that is movable within the frame, and such tray has received the drippings from the sensitized plate, and a movable cross-piece to support the upper edge of the plate has also been provided. Both the tray and cross-piece have been provided with lugs entering notches in the frame, as may be seen in Letters Patent No. 158,872. In these plate-holding frames the parts are not always adapted to the different sizes of glasses, either from inaccuracies in the glass or the workmanship of the frame.

My present invention relates to the peculiar construction of the movable cross-bar that receives the upper edge of the sensitized plate, whereby the holder is adapted to any size of plate within the capacity of the frame.

In the drawings, Figure 1 is an elevation of the frame, showing the hinged back as open. Fig. 2 is a horizontal section at the line $x\,x$. Fig. 3 is a vertical section at the line $y\,y$, and Fig. 4 is a plan of one corner of the cross-bar separate from the frame.

The frame is composed of the side pieces, $a\,a$, top piece, $b$, and bottom piece, $c$; and $d$ is the hinged back with spring to press upon the center of the plate, and $e$ is the slide that is withdrawn to expose the plate, all as usual.

The tray $f$ is hollow, having cross-wires $h$, that support the lower edge of the plate, and a cover, $g$, that is inclined in each direction to the central hole, $i$, and at $i'$ there is the opening through which the silver solution is poured out. The lugs $k$ at the ends of the tray $f$ are adapted to being passed into the notches in the inner faces of the sides $a$ of the frame, so as to place the tray in the position suitable for the particular plate, as in aforesaid patent.

The cross-bar $l$ is made with L-shaped ends $m\,m$, that are adapted to slide in the frame $a\,a$, and there are grooves lengthwise of these ends $m$ on the outer edges, and upon the inner faces of the frame $a\,a$ there are ribs $n$, upon which the cross-bar $l\,m$ can slide freely; and $o$ is a spring upon one of the end pieces $m$, taking against the surfaces of the frame $a$, so as to produce the friction necessary to hold the cross-bar in any position to which it may be moved. The ribs $n$ do not extend the entire height of the frame; hence the cross-bar $l\,m$ can be entered or withdrawn at the bottom part of the frame $a\,b\,c$ and moved up or down the proper distance to suit the glass plate that is to be held therein. The plate rests against the glass bearing-pieces $s$, that are inserted in the cross-bar $l$. These glass-bearing pieces are L-shaped, so as to come in contact with the face and the edge of the plate, and they are easily kept clean, so that the plate is not stained.

I claim as my invention—

1. In a photographic-plate holder, the combination, with the frame $a\,b\,c$ and the movable tray $f$, of the cross-bar $l$, end pieces, $m$, adapted to slide within the frame, and a friction-spring to hold the cross-piece in position, substantially as specified.

2. The cross-bar $l$, having glass bearing-pieces $s$ for the plate, end pieces, $m$, grooved to slide within the frame $a\,a$, and the ribs $n$ upon such frames $a$, as and for the purposes set forth.

Signed by me this 3d day of March, A. D. 1881.

MATHIAS FLAMMANG.

Witnesses:
GEO. T. PINCKNEY,
CHAS. H. SMITH.